(12) United States Patent
Ginter

(10) Patent No.: US 9,222,359 B2
(45) Date of Patent: Dec. 29, 2015

(54) SETTING TOOL AND METHOD FOR INSTALLING AN ANCHOR ROD

(71) Applicant: Hilti Aktiengesellschaft, Schaan (LI)

(72) Inventor: Herbert Ginter, Germaringen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/376,653

(22) PCT Filed: Jan. 29, 2013

(86) PCT No.: PCT/EP2013/051623
§ 371 (c)(1),
(2) Date: Aug. 5, 2014

(87) PCT Pub. No.: WO2013/117456
PCT Pub. Date: Aug. 15, 2013

(65) Prior Publication Data
US 2015/0016894 A1    Jan. 15, 2015

(30) Foreign Application Priority Data

Feb. 6, 2012    (DE) .......................... 10 2012 201 662

(51) Int. Cl.
*E21D 21/00* (2006.01)
*E21D 20/00* (2006.01)
*B25B 31/00* (2006.01)
(Continued)

(52) U.S. Cl.
CPC ................ *E21D 21/00* (2013.01); *B23B 31/14* (2013.01); *B23B 31/1612* (2013.01); *B25B 31/00* (2013.01); *E21D 20/00* (2013.01)

(58) Field of Classification Search
CPC .. B23B 31/14; B23B 31/1612; E21D 20/003; E21D 21/008
See application file for complete search history.

(56) References Cited

U.S. PATENT DOCUMENTS 2,828,134 A * 3/1958 Buck et al. ..................... 279/119
3,332,694 A * 7/1967 Price ............................... 279/66
(Continued)

FOREIGN PATENT DOCUMENTS

CH    632 313 A5    9/1982
CN    1516777 A     7/2004
(Continued)

OTHER PUBLICATIONS

PCT/EP2013/051623, International Search Report dated Mar. 20, 2014 (Three (3) pages).
(Continued)

*Primary Examiner* — Benjamin Fiorello
(74) *Attorney, Agent, or Firm* — Crowell & Moring LLP

(57) ABSTRACT

A setting tool for inserting an anchor rod into a borehole filled with a curable mass or filled with a cartridge containing a curable mass is disclosed. The setting tool includes a housing, which has a receptacle for the anchor rod, into which the anchor rod can be inserted in the longitudinal direction and in which the anchor rod can be fixed. At least one clamping element is tilted at an angle from the longitudinal axis of the receptacle and is supported in a guide in the receptacle in such a way that the clamping element can be moved from a receiving position, in which the anchor rod can be inserted into the receptacle in the longitudinal direction, to a clamping position, in which the anchor rod is fixed in the receptacle in the circumferential direction, by rotating the housing relative to the anchor rod.

14 Claims, 1 Drawing Sheet

(51) Int. Cl.
*B23B 31/14* (2006.01)
*B23B 31/171* (2006.01)

(56) References Cited

U.S. PATENT DOCUMENTS

| | | | | |
|---|---|---|---|---|
| 3,975,029 | A | * | 8/1976 | Benjamin .................... 279/131 |
| 4,289,427 | A | | 9/1981 | Rolston |
| 4,420,277 | A | * | 12/1983 | Hibbard et al. ............ 405/259.5 |
| 4,478,290 | A | * | 10/1984 | Orthwein ........................ 173/11 |
| 5,192,087 | A | * | 3/1993 | Kawashima et al. .......... 279/71 |
| 6,125,519 | A | | 10/2000 | Kaibach et al. |
| 6,698,529 | B2 | * | 3/2004 | Coombs et al. ................... 173/4 |
| 6,793,445 | B1 | * | 9/2004 | Charlton et al. ........... 405/259.5 |
| 6,981,559 | B2 | | 1/2006 | Rubie et al. |
| 7,066,688 | B2 | * | 6/2006 | Wallstein et al. .......... 405/302.2 |
| 7,547,161 | B2 | * | 6/2009 | Gascon ...................... 405/302.2 |
| 7,591,328 | B2 | * | 9/2009 | Guede .......................... 175/118 |
| 7,607,866 | B2 | * | 10/2009 | Eddowes et al. ........... 405/259.1 |
| 7,632,045 | B2 | | 12/2009 | Wu et al. |
| 7,955,034 | B2 | * | 6/2011 | Meidl ............................... 411/8 |
| 2004/0007437 | A1 | | 1/2004 | Linzell |

FOREIGN PATENT DOCUMENTS

| | | |
|---|---|---|
| CN | 101251021 A | 8/2008 |
| DE | 29 27 185 A1 | 1/1981 |
| DE | 29 48 040 A1 | 6/1981 |
| DE | 101 48 683 C1 | 10/2002 |
| EP | 0 925 879 B1 | 6/1999 |
| FR | 2 334 872 A1 | 7/1977 |
| JP | 53-138296 U | 11/1978 |
| JP | S60-87661 U | 6/1985 |
| JP | H09-195666 A | 7/1997 |
| WO | WO 01/11194 A1 | 2/2001 |

OTHER PUBLICATIONS

German Office Action dated Sep. 26, 2014, with partial Machine English translation (Seven (7) pages).
Chinese Office Action issued in counterpart Chinese Application No. 201380008051.2 dated Jul. 27, 2015, with English translation (Twelve (12) pages).
Japanese Office Action issued in counterpart Japanese Application No. 2014-555167 dated Aug. 25, 2015, with partial English translation (Nine (9) pages).

* cited by examiner

SETTING TOOL AND METHOD FOR INSTALLING AN ANCHOR ROD

This application claims the priority of International Application No. PCT/EP2013/051623, filed Jan. 29, 2013, and German Patent Document No. 10 2012 201 662.7, filed Feb. 6, 2012, the disclosures of which are expressly incorporated by reference herein.

BACKGROUND AND SUMMARY OF THE INVENTION

The invention relates to a setting tool for inserting an anchor rod into a borehole with a housing, which has a receptacle for the anchor rod, into which the anchor rod can be inserted in the longitudinal direction and secured therein. The invention additionally relates to a method for installing an anchor rod using such a setting tool.

Setting tools are used to insert anchor rods into a borehole in which they are anchored by means of a curable compound, such as a chemical mortar cartridge. These anchor rods usually do not have any points of attack for a tool such as a hexagonal wrench. The setting tool must thus act directly on the anchor rod.

Setting tools that can be screwed onto the thread of such an anchor rod, for example, are known from the prior art. However, with these setting tools, the anchor rod can be inserted only by rotating in one direction because the setting tool would be unscrewed from the anchor rod, i.e., from the thread of the anchor rod, if rotated in the opposite direction.

One solution to this problem is possible by means of a setting tool, which is tightened onto the thread, for example, by means of two nuts, which are tightened against one another. However, one problem with this setting tool is that the nuts must be screwed on and tightened in a separate operation, and the tightened connection cannot be loosened until after the curable compound has set up, because the anchor rod must be secured in order to release the tool. It is therefore very time consuming to work with such a setting tool because it is possible to continue working only after the curable compound has set up.

However, setting tools which hold the anchor rod on the thread are designed in principle for only one thread size, a separate tool is needed for each different diameter of the anchor rods.

However, there are known setting tools which require a special geometry (also known as an entraining geometry) on the anchor rods, for example, a hexagonal connection. These anchor rods are considerably more expensive and limit the flexibility of the entire anchor system with regard to the flexibility of the depth of the anchoring and the thickness of the component to be secured.

The object of the invention is to provide a flexible setting tool with which various anchor rods or even anchor rods without a thread can be used. No special entraining devices or entraining geometries are required on the anchor rods. Furthermore, no additional efforts are required with regard to temporary mounting of auxiliary tools and/or nuts or the like.

This object is achieved by the fact that at least one clamping element is provided with a setting tool of the type defined in the introduction; it is assigned to the receptacle, which is inclined at an angle to the longitudinal axis of the receptacle and is supported in a guide in the receptacle in such a way that the clamping element can be moved in the receptacle by rotating the housing in relation to the anchor rod out of a receiving position, in which the anchor rod can be inserted into the receptacle in the longitudinal direction, and into a clamped position, in which the anchor rod is secured in the receptacle in the circumferential direction and therefore the anchor rod follows the movement of the setting tool.

The object of the invention is to clamp the anchor rod on its outside circumference in a frictionally locked manner in the circumferential direction and in a form-fitting manner in the direction of insertion. Therefore, the anchor rod can be secured, regardless of the thread and/or the tool screwed onto the thread. After insertion of the anchor rod, at least one clamping element is moved radially inward from the receiving position until it is in contact with the anchor rod. Because of the inclined position of at least one clamping element in the housing of the setting tool, which is achieved due to the angle of tilt, the setting tool rolls on the outside circumference of the anchor rod, pulling the anchor rod into the setting tool so that the anchor rod becomes clamped with it. It is thus possible to adapt to various anchor rod diameters, depending on the radial distance between the starting position and the clamped position.

The anchor rod is secured on the tool and/or in the receptacle without the use of a tool by rotating the entire setting tool in relation to the anchor rod. At least one clamping element may already be loosely in contact with the anchor rod after insertion of the anchor rod into the receptacle, so that the setting tool is displaced by rotation of the receptacle due to the friction between the clamping element and the anchor rod in the receptacle, such that it is moved into the clamped position. However, the clamping element may also be moved from the starting position into the clamped position because of the forces of inertia.

The clamping element is preferably in contact with the anchor rod with the largest possible clamping surface, for example, to prevent damage due to the clamping on a thread that is provided on the anchor rod. Accordingly, the angle of attack is selected to yield secure clamping and the largest possible clamping surface.

The housing is preferably designed to be essentially cylindrical, with a bottom plate that has an opening for insertion of the anchor rod and with a cover plate opposite the bottom plate, these two plates being connected to one another by one or more connecting means. There is preferably no limit to the connecting means here. The plates may be connected to one another by means of a lateral surface that is partially or completely closed or by means of other connecting means, such as screws, rods, struts and the like. Alternatively, the cover plate or bottom plate may also be designed with a cup shape, so that special connecting means may be largely omitted. The anchor rod may be inserted through the opening in the bottom plate in the direction of the longitudinal axis of the cylinder until the anchor rod comes to rest against the cover plate. Securing the rod in the longitudinal direction of the anchor rod may also be achieved through the cover plate. However, the anchor rod must not be in contact with the cover plate at the start of assembly, i.e., when setting the anchor rod.

The guidance for at least one clamping element is formed by a groove in the bottom plate and in the cover plate, for example. This permits simple support of the clamping element without any additional components.

Depending on the desired clamping effect, the groove defines a linear or curved path on which the clamping element is guided from the receiving position into the clamping position on the anchor rod. Due to the shape of the groove, it is possible to have an influence on how rapidly the clamping element is guided on the anchor rod and/or how great the clamping force is. This path is preferably designed as a spiral that tapers toward the midpoint of the receptacle, so that due to a shallow inclination of the spiral, a very gradual approach of the clamping element to the anchor rod is achieved but therefore also a higher clamping force can be exerted on the anchor rod. On the other hand, due to a steeper inclination accordingly, a very rapid guidance of the clamping element, i.e., clamping at a very low rotation of the housing relative to the anchor rod is possible. However, a higher rotational force accordingly is required to apply high clamping forces.

In order for at least one clamping element(s) to be arranged at an angle of tilt to the axis of the setting tool and/or of the anchor rod, the grooves in the cover plate and in the bottom plate are arranged at an offset in the circumferential direction. As a result, the setting tool is pulled relative to the anchor rod in rotation of the housing, so that the head of the anchor rod is forced against the cover plate and is supported thereon. The offset of the grooves, i.e., the angle of tilt of the clamping element, is to be set as a function of the desired direction of rotation because such a tool can be used in only one direction of rotation. It is possible in this way to define whether the anchor rod can be in right-handed or left-handed rotation of the setting machine (pneumatic drill, screwdriver). This has the advantage that depending on the (exterior) structure of the part of the anchor rod that is inserted into the borehole, where the structure may optionally have the function of an Archimedean screw, the direction of rotation of the setting tool can be selected so that the curable compound in the borehole is not conveyed out of the borehole during or after the setting process.

For example, the clamping element has a bolt or a screw, which extends essentially in the longitudinal direction through the housing and in particular is supported in the bottom plate and in the cover plate.

For example, a clamping jaw with which the clamping element can act on the anchor rod is supported on the bolt or the screw. The clamping jaw offers a sufficiently large contact surface area to form a contact pressure surface or rolling surface distributed over a large area on the anchor rod. The length of the setting tool, which surrounds the anchor rod, preferably amounts to max. 80% of the length of the part of the anchor rod that protrudes out of the substrate after setting the rod. This therefore ensures that the housing of the setting tool will not come to rest on the substrate when turning the anchor rod. Otherwise the tool or the substrate could be damaged. However, the planned excess of material of the curable compounds that are displaced by the anchor rod may emerge from the borehole into which the anchor rod is inserted without soiling the tool.

The clamping jaw is preferably a roller, which is mounted to rotate around the bolt or the screw and is made of a softer material, for example, a plastic or a rubbery material which has a high wear resistance in particular. By rotating the clamping jaw in displacement of the clamping element from the receiving position into the clamping position, it is ensured that there will not be any excessive wear due to friction on the anchor rod or on the clamping element because the roller is rolling on the anchor rod to a certain extent. Since the roller is made of a softer material, it is more adaptable to the anchor rod. However, the material is softer than the anchor rod, which is usually made of metal, e.g., steel. Damage to the anchor rod is therefore reliably prevented.

The bolt or the screw is mounted with guide elements in the guide in particular in the groove, for example, so that the guide elements set the angle of inclination at which the clamping element is inclined to the longitudinal axis of the receptacle. The inclination is set by the guides arranged with an offset in the circumferential direction. The guide elements have supporting surfaces, which are arranged perpendicular to the longitudinal axis of the clamping elements, so that despite the angle of tilt, a planar contact surface is provided for the clamping elements. However, simple sliding of the bolt or the screw in the groove or the guide is ensured by the guide elements.

To presecure the anchor rod in the receptacle, so that the anchor rod cannot fall out before the clamping elements are displaced into the clamping position, the opening of the bottom plate is preferably designed to be elastic for presecuring the anchor rod. The anchor rod is therefore centered in the receptacle. Secondly, the anchor rod cannot slip out of the receptacle. The flexible opening also prevents soil from penetrating into the receptacle, so that reliable functioning of the clamping element is ensured. The opening is preferably designed as a rubber collar.

To achieve the most uniformly distributed clamping force, three clamping elements are preferably provided, arranged so they are distributed uniformly around the anchor rod in the circumferential direction.

The tool preferably has a fastener for a setting machine, for example, a drilling machine, to be able to rotate the setting tool and thus the anchor rod and/or to move it in the direction of a borehole.

In addition, a method according to the invention is provided for installing an anchor rod with a setting tool according to the invention. In this method, the anchor rod is first inserted into the receptacle of the setting tool in the longitudinal direction. Then the anchor rod is inserted into a borehole with the help of a setting tool and the setting tool is started. The setting tool here is rotated in the direction of rotation in relation to the anchor rod, so that at least one clamping element is guided against the anchor rod, rolls on it and therefore clamps the setting tool with the anchor rod. In this clamped condition, the anchor rod is then tightened into the borehole filled with the chemical mortar until reaching the desired position. Then the setting tool is simply released again by turning the setting tool opposite the direction of rotation in setting the anchor rod.

Additional advantages and features are derived from the following description in conjunction with the accompanying drawings.

DETAILED DESCRIPTION OF THE DRAWINGS

Figure 1:
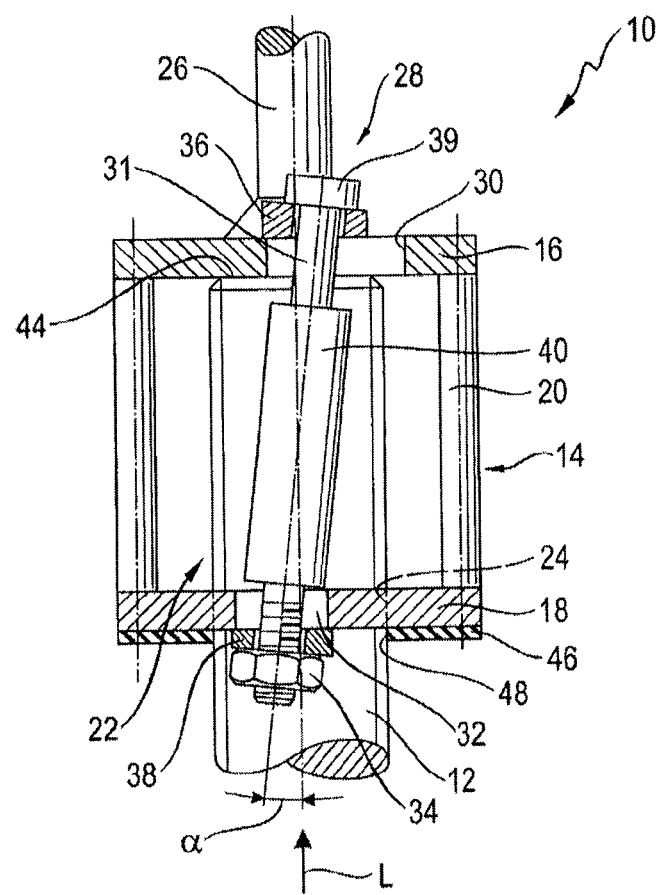
FIG. 1 shows a sectional view through a setting tool according to the invention.

FIG. 1 shows a setting tool 10 for insertion of an anchor rod 12. The anchor rod 12 is inserted into a borehole (not shown here) in a substrate and secured therein by means of a curable compound, for example. Such a curable compound consists of at least two chemical components, which may be either mixed or unmixed when poured into the borehole, where they react with one another and set up, forming a physically bonded and/or form-fitting connection between the substrate, the curable compound and the anchor rod. By rotating the anchor rod into the borehole filled with the curable compound, the chemical components are mixed together and made to set up. The anchor rod 12 may have a thread, for example, but it is also conceivable for other means to be provided on the anchor rod 12 for transferring a load, for example, ribs or protrusions, or for the anchor rod 12 to be designed to be smooth on the outside.

The setting tool 10 has a housing 14 with a cover plate 16, a bottom plate 18 and connecting elements 20. The cover plate 16 and the connecting elements 20 together may also form a cup-shaped or can-shaped unit. The housing 14 is thus designed to be essentially cylindrical and defines a receptacle 22 for the anchor rod 12 in its interior. An opening 24 through which the anchor rod 12 can be inserted into the receptacle 22 in the longitudinal direction L is provided on the bottom plate 18. A fastener 26 for a setting machine, for example, a drilling machine is provided on the cover plate 16. The setting tool has three clamping elements 28 arranged uniformly around the receptacle 22 (see FIG. 2 in particular), only one clamping element 28 of which is shown in FIG. 1 for reasons of simplicity.

Figure 2:
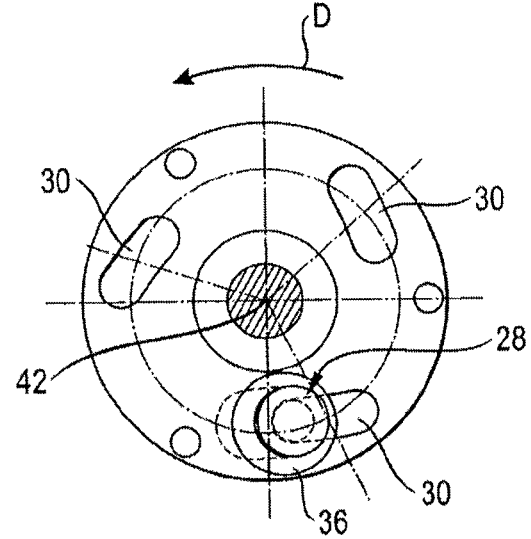
FIG. 2 shows a top view of the cover plate of the setting tool from FIG. 1.

For supporting the clamping elements 28, grooves 30 are provided in the setting tool. As shown in FIG. 2, the grooves 30 are designed with a curvature, so that the radial distance from the midpoint 42 of the receptacle 22 is reduced in the direction opposite the direction of rotation D. FIG. 2 shows three grooves 30 arranged with a uniform distribution, one groove 30 being provided for each clamping element 28. The grooves 32 in the bottom plate 18 are designed to be similar to the former, so that the grooves 32 in the bottom plate 18 are arranged with an offset in the direction opposite the direction of rotation D, and the clamping element 28 is inclined at an angle of tilt a.

The clamping element 28 has a screw 31, which is supported on the cover plate 16 and the bottom plate 18 in one groove 30, 32 each, where each forms a guide for the clamping element 28 and is secured by a nut 34 in the bottom plate 18. As shown in FIG. 1, the screw 31 is inclined at an angle of tilt a to the longitudinal axis of the housing 14. A guide element 36, 38 is provided on each of the grooves 30, 32. These guide elements 36, 38 serve to provide a flat supporting surface for the head 39 of the screw 31 and the nut 34 despite the angle of tilt a of the screw 31. A clamping jaw 40, which is provided on the screw 31 and is formed by a roll is supported rotatably on the screw 31.

For mounting an anchor rod 12, it is inserted into the receptacle 22 in the longitudinal direction L until the head 44 of the anchor rod 12 comes to rest on the cover plate 16 (see FIG. 1). The clamping elements 28 are in a starting position, which corresponds to the maximum possible distance from the midpoint 42 of the receptacle 22. In the embodiment shown here, this corresponds to the front end of the groove 30, 32 in the direction of rotation. The clamping elements may also be in loose contact with the anchor rod and may be displaced in the housing because of the friction between the anchor rod 12 and the clamping elements 28, as is the case with anchor rods having a larger diameter in particular.

The anchor rod 12 will now be inserted with the attached setting tool 10 into the borehole, which is partially filled with the curable compound. By means of a setting machine (drilling machine, screwdriver), the setting tool 10 is accelerated in the direction of rotation D by means of the fastener 26. In doing so, the housing 14 is rotated in the direction of rotation D against the anchor rod 12. The clamping elements 28 are supported in the grooves 30 and/or 32, so that they are floating, such that rotation of the setting tool 10 in the direction of rotation D causes the clamping elements to move opposite the direction of rotation D from a starting position inward into a clamping position against the anchor rod because of the forces of inertia in the grooves 30, 32, where they become clamped on the anchor rod and roll on it in the setting direction of the anchor rod due to the inclined position of the clamping elements. A self-clamping effect can be achieved through a suitable design of the grooves 30, 32.

Once the desired position of the anchor rod in the borehole has been reached, the rotational movement D is stopped. The setting tool 10 is released from the anchor rod 12 by rotating it opposite the direction of rotation D against the anchor rod 12, so that the clamping elements 28 are moved out of the clamping position and, in the direction of rotation D in the grooves 30 and/or 32, back into the starting position, in which they no longer secure the anchor rod 12. Clamping of the anchor rod 12 and/or the release of this anchor rod thus take place without any additional tool, so that rapid and simple operation with such a setting tool 10 is possible. The rotation of the housing may be accomplished, for example, by the setting machine (pneumatic drill, screwdriver).

Due to the angle of tilt a of the clamping elements 28, the anchor rod 12 is pulled in the direction toward the cover plate 16 when the setting tool is secured, i.e., when rotating in the direction of rotation D, so that the anchor rod 12 is connected in a form-fitting manner in the setting tool 10.

In addition, an elastic washer 46, which serves to presecure the anchor rod 12, is provided on the bottom plate 18. The opening 48 in the washer 46 is selected, so that it is smaller than the diameter of the smallest anchor rod to be inserted. On insertion of the anchor rod 12, this opening 48 can yield elastically, so that it is in contact with the circumference of the anchor rod. The anchor rod 12 is therefore presecured and centered in the receptacle 22. In addition, the elastic washer 46 provides a splash guard for protection against contaminants, so that dust, mortar and other contaminants cannot penetrate into the receptacle 22 and soil the clamping jaws and/or the clamping elements 28, which could thus interfere with the functioning of the setting tool.

The length of the part of the setting tool 10 which surrounds the anchor rod 12 is selected so that it corresponds to max. 80% of the length of the section of the anchor rod 12, which protrudes out of the substrate after setting. This ensures that the setting tool 10 cannot be in contact with the substrate on insertion of the anchor rod but instead is kept at a distance from it. This ensures that when the anchor rod 12 is tightened, there is no damage to the substrate or to the setting tool 10. However, this distance is necessary because when the anchor rod 12 is inserted, the planned excess of mortar, which is displaced out of the borehole, can flow out and does not soil the setting tool 10.

The material of the clamping jaws 40 here is selected so as to yield a good force-locking connection to the anchor rod 12. On the other hand, it is necessary to ensure that if the anchor rod 12 has a thread, this thread is not damaged in tightening of the anchor rod 12. Rubbery materials or plastics are preferably used for this reason. These materials should in any case be softer than the material of the anchor rod 12, so that damage to the anchor rod 12 is reliably prevented.

In the exemplary embodiment shown here, the setting tool 10 is suitable for tightening the anchor rod 12 in only one direction of rotation D. If another direction of rotation D is desired, a different setting tool with opposite guides and/or grooves 30, 32 and/or with an opposite angle of tilt a would be required. However, it is also conceivable for the clamping elements 28 to be designed so that they are guided on the anchor rod 12 independently of the direction of rotation D and clamp it.

The invention claimed is:

1. A setting tool for inserting an anchor rod into a borehole that is filled with a curable compound or with a cartridge containing a curable compound, comprising:
    a housing with a receptacle, wherein the anchor rod is insertable into the receptacle in a longitudinal direction and wherein the anchor rod is securable in the receptacle; and a clamping element, wherein the clamping element is inclined at an angle of tilt to a longitudinal axis of the receptacle and is supported in a guide in the receptacle such that the clamping element is movable by rotation of the housing out of a receiving position, in which the anchor rod is insertable into the receptacle in the longitudinal direction, and into a clamping position, in which the anchor rod is securable in the receptacle in a circumferential direction and in the longitudinal direction.

2. The setting tool according to claim 1, wherein the housing is essentially cylindrical, with a bottom plate, which has an opening for insertion of the anchor rod and a cover plate opposite the bottom plate.

3. The setting tool according to claim 2, wherein the guide is formed by respective grooves in the bottom plate and the cover plate of the housing.

4. The setting tool according to claim 3, wherein the grooves define a linear or curved path on which the clamping element is guided from the receiving position into the clamping position.

5. The setting tool according to claim 4, wherein the grooves are arranged with an offset in the circumferential direction.

6. The setting tool according to claim 2, wherein the opening in the bottom plate is elastic.

7. The setting tool according to claim 1, wherein the clamping element has a bolt or a screw, which extends essentially in the longitudinal direction through the housing and is supported in a bottom plate and a cover plate of the housing.

8. The setting tool according to claim 7, wherein a clamping jaw is supported on the bolt or the screw and wherein the clamping element is actable on the anchor rod with the clamping jaw.

9. The setting tool according to claim 8, wherein the clamping jaw is a roll that is supported on the bolt or the screw such that the clamping jaw is rotatable about the bolt or the screw.

10. The setting tool according to claim 8, wherein the clamping jaw is made of rubber or plastic.

11. The setting tool according to claim 7, wherein the bolt or the screw is supported with guide elements and wherein the angle of tilt of the clamping element is adjustable by the guide elements.

12. The setting tool according to claim 1, further comprising a second and a third clamping element, wherein the clamping elements are distributed uniformly in the circumferential direction.

13. The setting tool according to claim 1, further comprising a fastener for a setting machine on the housing.

14. A method for mounting an anchor rod with a setting tool according to claim 2, comprising the steps of:
  inserting the anchor rod into the receptacle of the setting tool in the longitudinal direction;
  inserting the anchor rod into a borehole;
  turning the setting tool relative to the anchor rod in a direction of rotation such that the clamping element is guided against the anchor rod until the cover plate is in a form-fitting connection with an end of the anchor rod, which clamps the setting tool with the anchor rod in a force-locking manner; and
  releasing the setting tool by rotating the setting tool opposite the direction of rotation in relation to the anchor rod.

* * * * *